(12) United States Patent
Maekawa et al.

(10) Patent No.: US 11,644,448 B2
(45) Date of Patent: May 9, 2023

(54) CHROMATOGRAPHY MASS SPECTROMETRY AND CHROMATOGRAPH MASS SPECTROMETER

(71) Applicant: HITACHI HIGH-TECH CORPORATION, Tokyo (JP)

(72) Inventors: Akira Maekawa, Tokyo (JP); Shinya Ito, Tokyo (JP); Hiromichi Yamashita, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 172 days.

(21) Appl. No.: 16/621,405

(22) PCT Filed: Jun. 12, 2017

(86) PCT No.: PCT/JP2017/021564
§ 371 (c)(1),
(2) Date: Dec. 11, 2019

(87) PCT Pub. No.: WO2018/229811
PCT Pub. Date: Dec. 20, 2018

(65) Prior Publication Data
US 2020/0103380 A1 Apr. 2, 2020

(51) Int. Cl.
*G01N 30/72* (2006.01)
*G01N 30/86* (2006.01)

(52) U.S. Cl.
CPC ......... *G01N 30/72* (2013.01); *G01N 30/8631* (2013.01); *G01N 30/8668* (2013.01)

(58) Field of Classification Search
CPC . G01N 30/72; G01N 30/8631; G01N 30/8668
(Continued)

(56) References Cited

U.S. PATENT DOCUMENTS

| 4,752,888 A | 6/1988 | Yoshihara |
| 5,119,315 A | 6/1992 | Kemp et al. |
| 10,526,430 B2 * | 1/2020 | Nakahara ............ C08F 285/00 |
| 2005/0116159 A1 * | 6/2005 | Becker ................ H01J 49/0036 250/281 |

(Continued)

FOREIGN PATENT DOCUMENTS

| CN | 105510480 A * | 4/2016 |
| JP | S61145457 A | 7/1986 |

(Continued)

OTHER PUBLICATIONS

English Abstract of CN 105510480, Apr. 2016. (Year: 2016).*
(Continued)

*Primary Examiner* — Michael P Nghiem
(74) *Attorney, Agent, or Firm* — Miles & Stockbridge, P.C.

(57) ABSTRACT

A chromatography-mass spectrometry method and apparatus of the present invention includes adding, to a sample, an internal standard material having a retention time similar to that of a target analyte and having a mass-to-charge ratio different from that of the target analyte; measuring the sample with a chromatograph-mass spectrometer and obtaining a chromatogram 101 of the target analyte and a chromatogram 102 of the internal standard material; detecting a peak 113 from the chromatogram of the internal standard material and obtaining a peak start time and a peak end time of the peak; and applying the obtained peak start time and peak end time to a peak start time and a peak end time of the chromatogram of the target analyte.

12 Claims, 5 Drawing Sheets

(58) Field of Classification Search
USPC .......................................................... 702/1
See application file for complete search history.

(56) References Cited

U.S. PATENT DOCUMENTS

| | | |
|---|---|---|
| 2006/0141631 A1 | 6/2006 | Bondarenko et al. |
| 2008/0283740 A1* | 11/2008 | Hashiba et al. |
| 2014/0129169 A1* | 5/2014 | Noda ................ G01N 30/8665 |
| | | 702/89 |
| 2014/0194304 A1 | 7/2014 | Shi et al. |
| 2015/0064792 A1 | 3/2015 | Hayakawa et al. |
| 2016/0266074 A1* | 9/2016 | Ueno ................ G01N 30/8665 |
| 2017/0336370 A1* | 11/2017 | Noda ................ G01N 30/8675 |
| 2020/0033303 A1* | 1/2020 | Tamaoki ............ G01N 30/8658 |
| 2020/0107781 A1* | 4/2020 | Navalgund ............ A61B 5/392 |
| 2020/0309747 A1* | 10/2020 | Yamamoto ............ G01N 30/86 |

FOREIGN PATENT DOCUMENTS

| | | |
|---|---|---|
| JP | S63151851 A | 6/1988 |
| JP | 2005522713 A | 7/2005 |
| JP | 2008286568 A | 11/2008 |
| JP | 2009257961 A | 11/2009 |
| JP | 2012163475 A | 8/2012 |
| JP | 2012163476 A | 8/2012 |
| JP | 2016191721 A | 11/2016 |

OTHER PUBLICATIONS

ISA 210 International Search Report w/translation submitted in PCT/JP2017/021564 dated Aug. 18, 2017.

Office Action dated Jul. 29, 2021 in Chinese Application No. 201780091927.2.

Wang Jie et al. "A priori SNR estimator based on harmonic regeneration" Computer Engineering and Applications, 2018. vol. 54, Issue 7, pp. 44-48.

Office Action dated Jan. 19, 2022 in Chinese Application No. 201780091927.2.

Liaoning Normal University 1997 Master's Thesis Collection Science Edition 1994-1997, Aug. 31, 1997, pp. 265-270.

* cited by examiner

[FIG. 1]
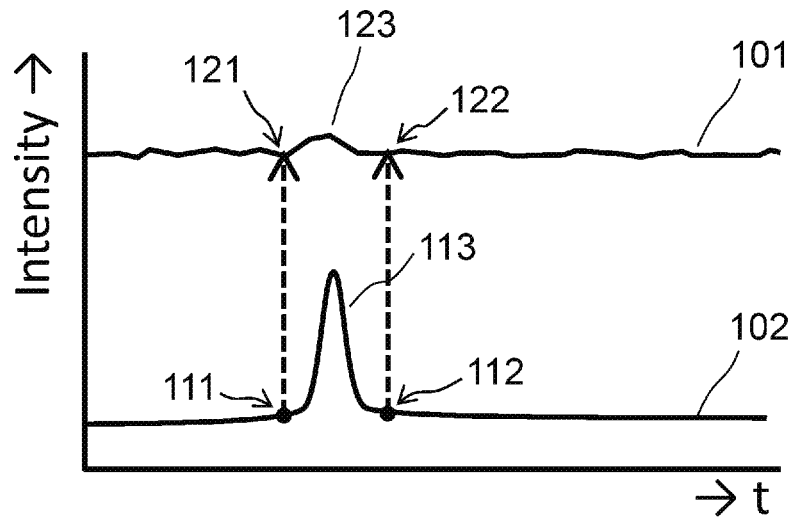
[FIG. 2]
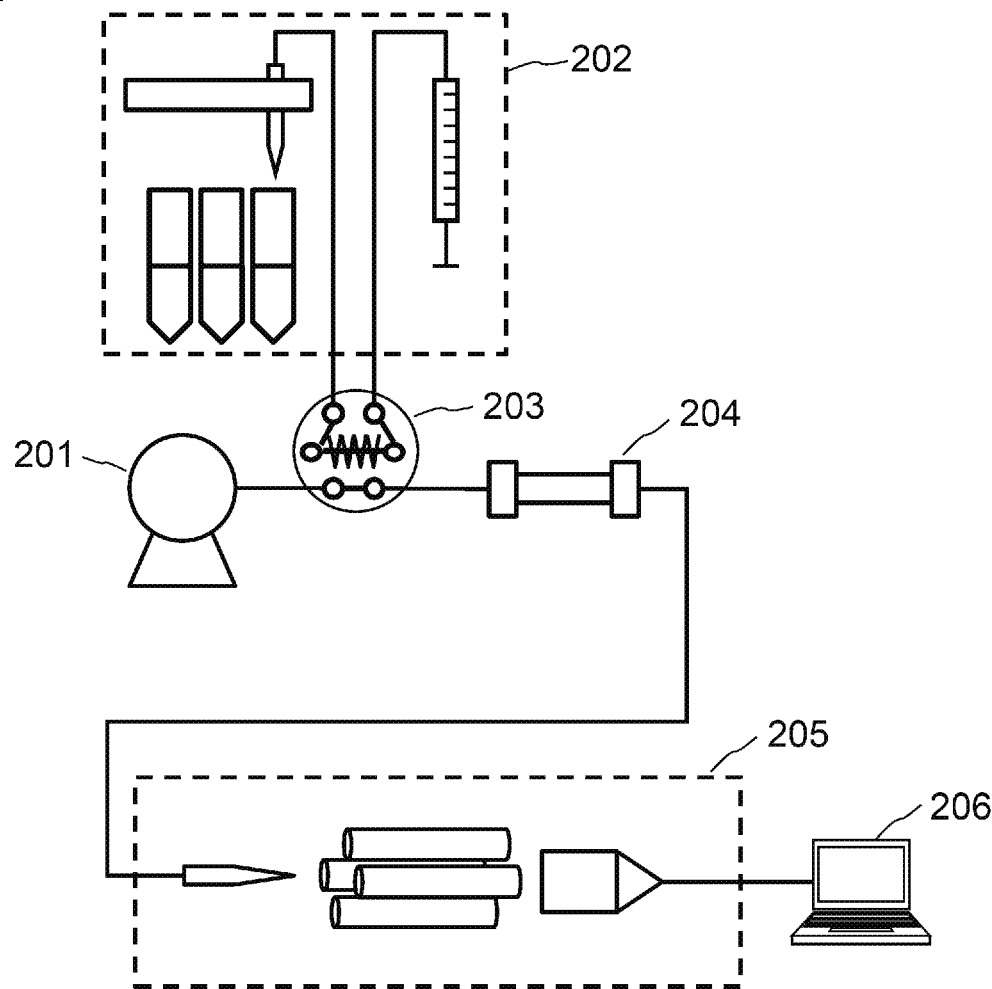

[FIG. 3]
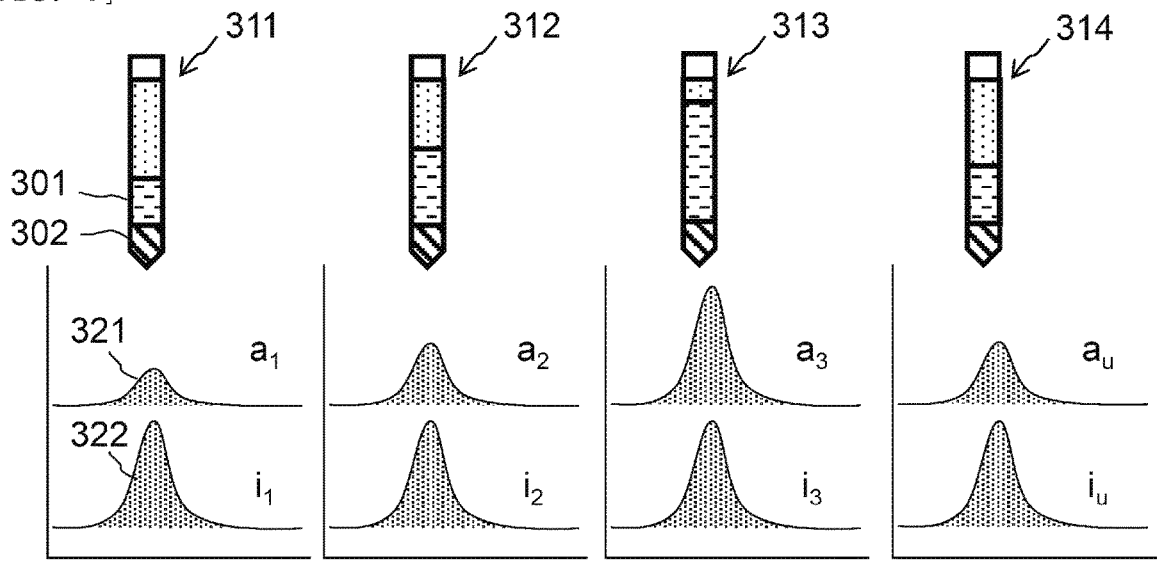
[FIG. 4]
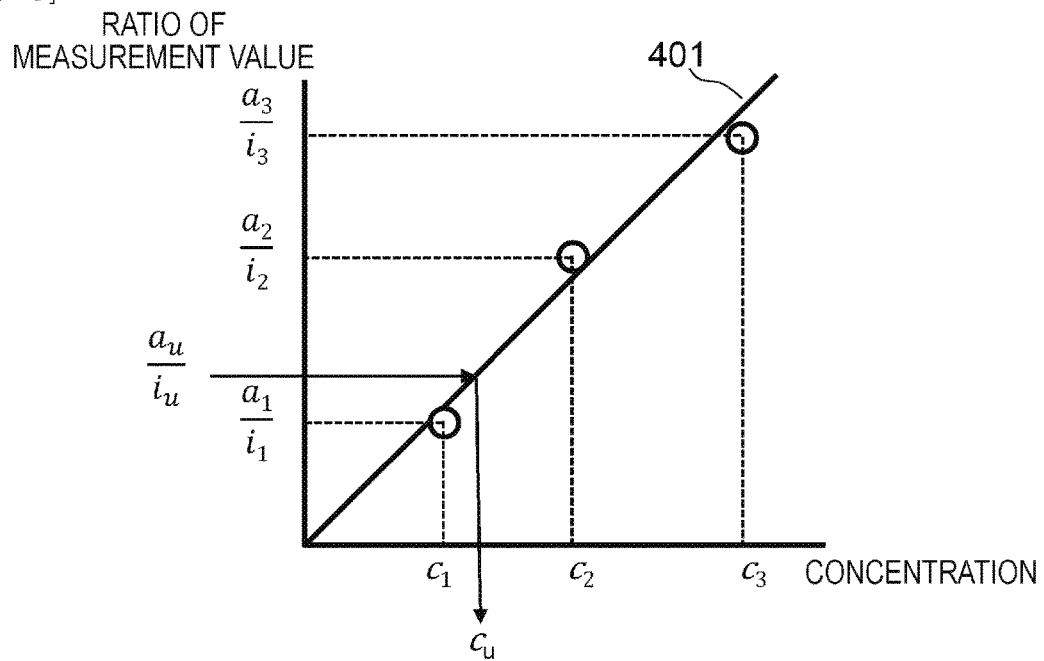

[FIG. 5]
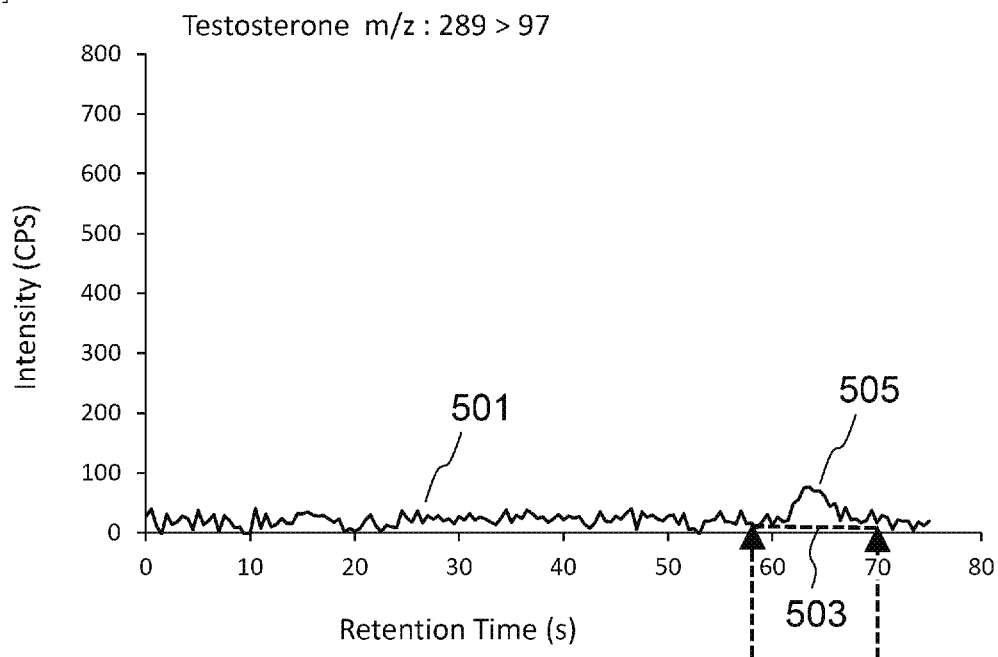
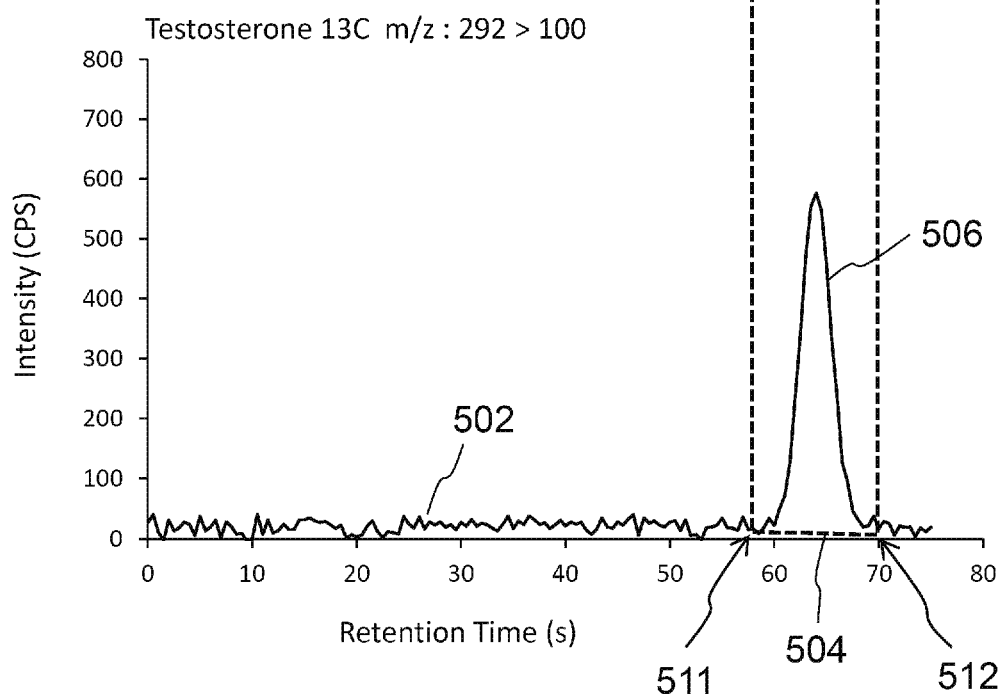

[FIG. 6]
| ID | Name | Expected RT | RT Range | IS ID | Peak Detect Type |
|---|---|---|---|---|---|
| 1 | Testosterone | — | — | 2 | With IS |
| 2 | Testosterone 13C | 64 | 10 | 0 | Fitting |
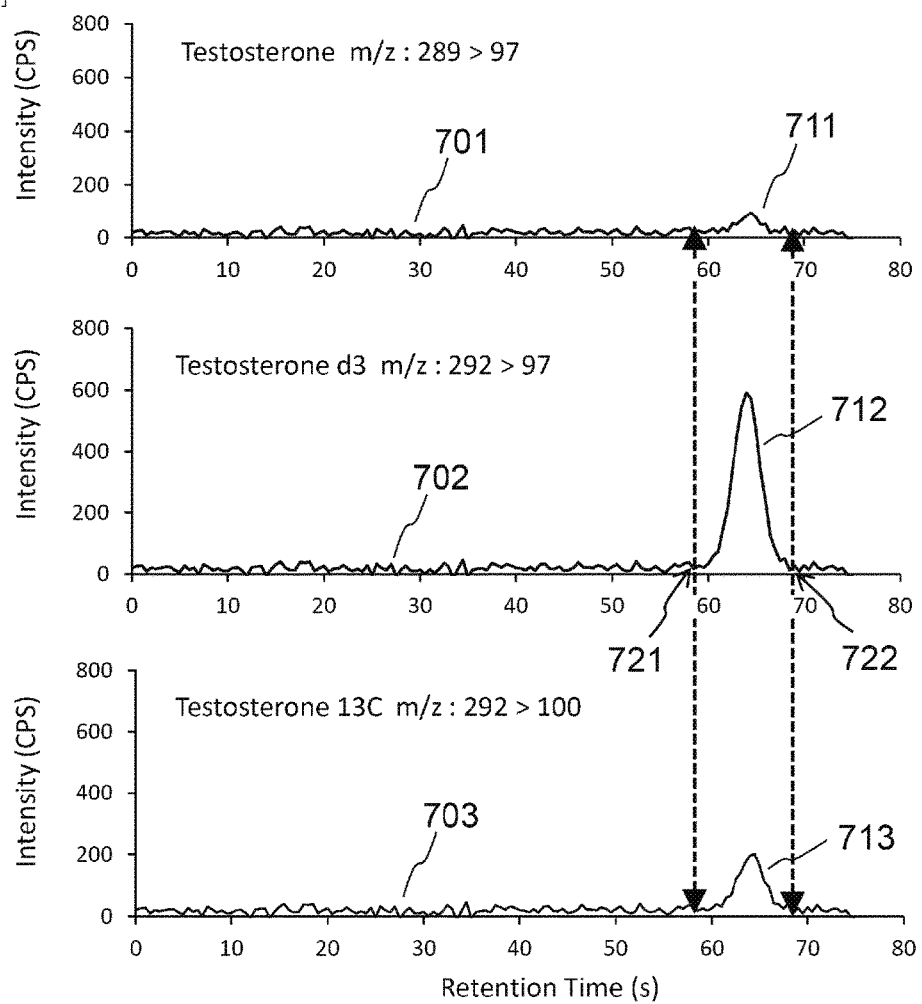
[FIG. 7]

[FIG. 8]
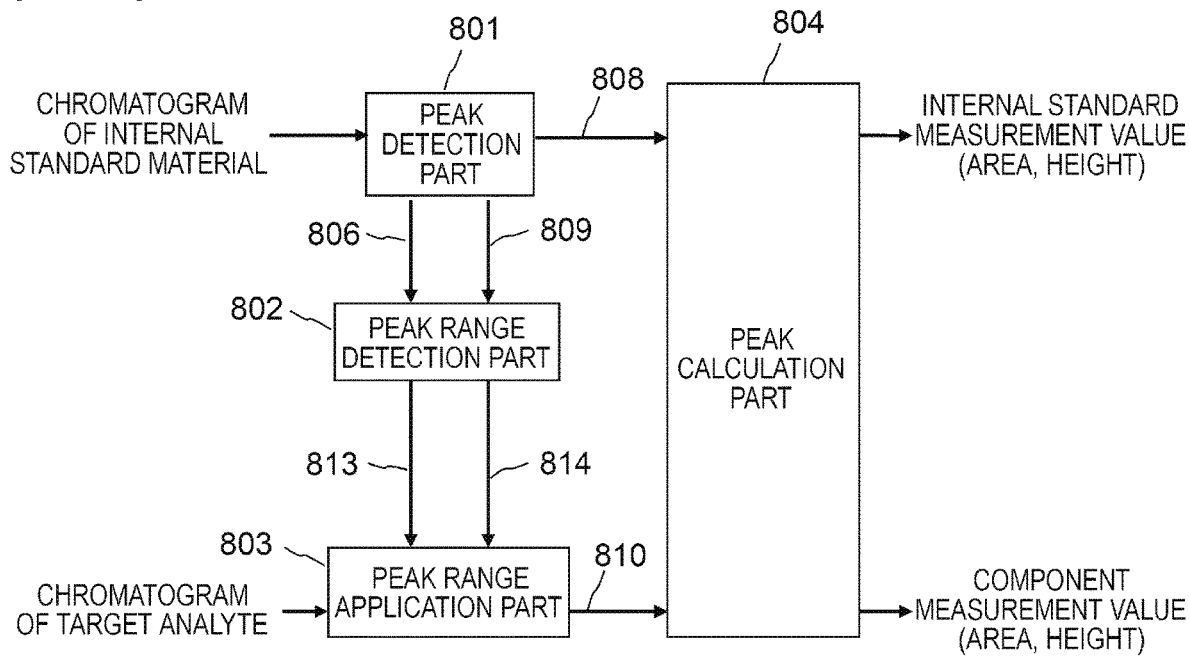
[FIG. 9]
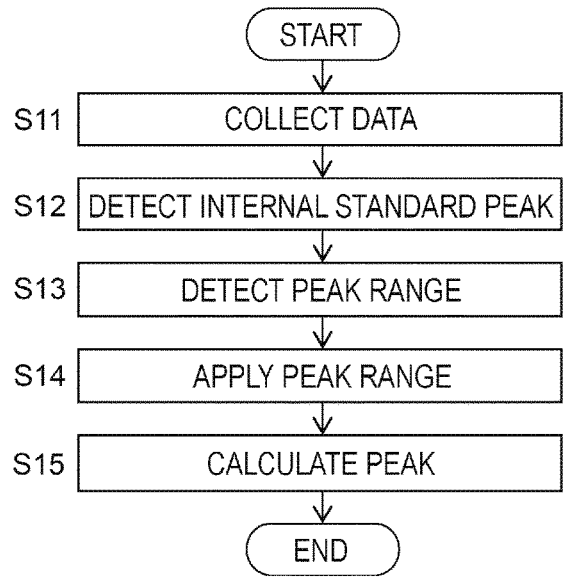

CHROMATOGRAPHY MASS SPECTROMETRY AND CHROMATOGRAPH MASS SPECTROMETER

TECHNICAL FIELD

The present invention relates to a chromatography-mass spectrometry and a chromatograph-mass spectrometer.

BACKGROUND ART

In recent years, a quantitative analysis method using a liquid chromatograph-mass spectrometer is frequently used to analyze a chemical component and a metabolite in a biofluid, and a residue in an environmental sample. An HPLC in which a separation time in a column is a maximum of several ten minutes or a UHPLC in which separation is performed in a maximum of serval minutes is used for a liquid chromatograph. Also, a mass spectrometer that detects a separated component includes, for example, a quadrupole mass spectrometer, an ion trap mass spectrometer, and a time-of-flight mass spectrometer. These spectrometers are used according to the purpose of analysis, and for the purpose of quantification, the quadrupole mass spectrometer is frequently used.

The quadrupole mass spectrometer can measure a sample by scanning or selected ion monitoring (SIM). The scanning is used for qualitative analysis of an unknown sample, and detects an ion amount with respect to a mass-to-charge ratio as a signal in a range of a predetermined mass-to-charge ratio (m/z). The SIM selectively detects the ion amount with respect to the mass-to-charge ratio designated in advance. In a triple-quadrupole mass spectrometer, selected reaction monitoring (SRM) that selectively detects an amount of a specific product ion generated from a target analyte is also used. When the mass-to-charge ratio of the ion derived from the target analyte and its product ion is known, the quantitative analysis can be performed with high sensitivity by these methods.

In the identification of the chemical component and the metabolite in the biofluid, and the residue in the environmental sample, a chromatogram indicating a change over time of the ion amount by the SIM or the SRM of the liquid chromatograph-mass spectrometer is obtained, and a peak corresponding to the target analyte and an internal standard material is detected to obtain a measurement value. In peak detection, it is generally performed to calculate an area and a height of the peak as the measurement value after determining a start point and an endpoint of the peak. The target analyte and the internal standard material are determined by a retention time of the peak, and the retention time depends on a type and a state of a column of the liquid chromatograph, and a separation condition. A peak detection method includes a method that performs gradient detection of data variations, and as a method of developing the method, there are a shoulder peak detection method as disclosed in PTL 1 and a method of performing detection by fitting to any function as disclosed in PTL 2.

CITATION LIST

Patent Literature

PTL 1: JP-A-61-145457
PTL 2: JP-A-63-151851

SUMMARY OF INVENTION

Technical Problem

When a peak is identified from a chromatogram and an area and a height of the peak are calculated, the peak is detected by using, for example, the methods disclosed in PTL 1 and PTL 2. However, in the analysis of a chemical component and a metabolite in a biofluid, and a residue in an environmental sample, in some cases, a target analyte may be significantly small. In this case, a clear peak does not appear on the chromatogram, and it is necessary to detect the target analyte by combining noise removal and advanced signal processing, thereby becoming difficult to detect the peak.

In the analysis performed by a chromatograph, there is a problem of variations in the retention time. The retention time of the target analyte is affected by clogging of a flow path, deterioration in a column, and a delicate difference in the environmental temperature and the column temperature. Therefore, even though the retention time of the target analyte under the specified analysis conditions is known, it is common to search for a peak position by providing a time range. In addition to the above-described case where the peak detection is difficult, when considering that the retention time varies, calculation of a measurement value of the target analyte becomes more difficult.

According to the above-described state, even when the target analyte is significantly small, a method capable of accurately identifying the peak position and calculating the measurement value is required.

Solution to Problem

As one aspect, a chromatography-mass spectrometry of the present invention includes: a step of adding, to a sample, an internal standard material having a retention time similar to that of a target analyte and having a mass-to-charge ratio different from that of the target analyte; a step of measuring the sample with a chromatograph-mass spectrometer and obtaining a chromatogram of the target analyte and a chromatogram of the internal standard material; a step of detecting a peak from the chromatogram of the internal standard material and obtaining a peak start time and a peak end time of the peak; and a step of applying the obtained peak start time and peak end time to a peak start time and a peak end time of the chromatogram of the target analyte.

As one aspect, a chromatograph-mass spectrometer of the present invention is a chromatograph-mass spectrometer that simultaneously measures a target analyte and an internal standard material, and obtains a chromatogram of the target analyte and a chromatogram of the internal standard material, and the chromatograph-mass spectrometer includes: a peak detection part that obtains a peak start point and a peak end point from the chromatogram of the internal standard material; a peak range detection part that extracts a peak start time and a peak end time from the peak start point and the peak end point detected by the peak detection part; and a peak range application part that applies the peak start time and the peak end time extracted by the peak range detection part to a peak start point and a peak end point of the chromatogram of the target analyte.

Advantageous Effects of Invention

According to the present invention, a measurement value can be calculated without affecting the quality of a chromatogram of a target analyte.

Issues, configurations, and effects other than those described above will be clarified by the description of the following embodiments.

BRIEF DESCRIPTION OF DRAWINGS

FIG. 1 is a conceptual diagram illustrating an example in which a retention time of a component peak start point and a component peak end point of an internal standard material chromatogram is applied to a peak start point and a peak end point of a target analyte chromatogram.

FIG. 2 is a schematic diagram illustrating a configuration example of a liquid chromatograph-mass spectrometer.

FIG. 3 is a conceptual diagram illustrating an example of a sample produced by an internal standard method and an example of signal intensity when the sample is measured by a mass spectrometer.

FIG. 4 is a diagram illustrating an example of a calibration curve generated by the internal standard method.

FIG. 5 is a diagram illustrating an example of measurement result data of SRM in an unknown sample of Testosterone and Testosterone 13C.

FIG. 6 is a diagram illustrating an example of a graphical user interface.

FIG. 7 is a diagram illustrating an example in which a retention time of a peak start point and an end point of Testosterone d3 is applied to a peak start point and an end point of Testosterone and Testosterone 13C.

FIG. 8 is a functional block illustrating an example of a configuration related to peak detection.

FIG. 9 is a flowchart illustrating a flow of processing related to peak detection.

DESCRIPTION OF EMBODIMENTS

Hereinafter, embodiments of the present invention will be described with reference to the drawings. The embodiments of the present invention are not limited to embodiments which will be described later, and various modifications can be made within the scope of the technical idea thereof.

Here, although a liquid chromatograph-mass spectrometer is described as an example of a chromatograph-mass spectrometer, it is sufficient that a target analyte and an internal standard material are simultaneously measured, and the present invention can be also applied to a gas chromatograph-mass spectrometer.

Example 1

An example of detecting Testosterone, which is one of the male hormones, by using the simplest device configuration in a general liquid chromatograph-mass spectrometer will be described. FIG. 2 is a schematic diagram illustrating a configuration example of a liquid chromatograph-mass spectrometer.

A solvent feeding part 201 feeds a solvent such as water and acetonitrile. Generally, it is possible to perform isocratic liquid feeding in which two or more solvents are installed and the ratio is fixed, and gradient liquid feeding in which the composition of the solvent is changed by a time program. The solvent feeding part 201 always feeds the solvent even during the time other than during analysis, and a sample separation part 204 is balanced and stabilized.

A sample introduction part 202 installs a sample desired to be analyzed by an analyst and sequentially sucks the sample by a sample introduction unit called an automatic sampler. Also, a part such as a needle and a sample introduction flow path needs to be cleaned every time the sample is sucked. Therefore, although not illustrated in the drawing, it is common that a cleaning unit is mounted separately.

A sample injection part 203 is a part for injecting the sample sucked by the sample introduction part into the flow path from the solvent feeding part. The sample injection part 203 generally uses one in which a 6-port valve is combined with a pipe called a sample loop. The sample loop is usually connected to the side of the sample introduction part. When the sample is sucked, the sample sucked by the sample introduction part is introduced into the sample loop, and the introduction is completed. Then, the sample loop filled with the sample is switched to the flow path to the sample separation part, thereby forming a structure in which the sample is injected into the flow path from the solvent feeding part 201 to the sample separation part 204.

The sample separation part 204 is provided with a column for separating the sample for each component. The column is formed by filling a metal cylinder with a packing material such as silica gel or a polymer. When the sample is injected thereinto from one side and the solvent is continuously fed thereinto, the component moves in the column at a speed corresponding to the affinity between the component and the packing material. The component is separated by using the above. Since the characteristics of the column significantly vary depending on a type or a particle size of the packing material, the column needs to be appropriately selected according to the type of the component to be separated and the purpose thereof.

A mass spectrometry part 205 is a part that ionizes the component separated by the sample separation part 204 and detects the component by a mass-to-charge ratio. An ionization method includes an electrospray ionization method (ESI) and an atmospheric pressure chemical ionization (APCI) method. A quadrupole type, an ion trap type, and a time-of-flight type are generally used for the mass spectrometry part. In the quadrupole type, there is a triple-quadrupole type in which three stages are disposed in addition to a type in which the quadrupole is disposed in one stage. Here, the ion selected in the first stage is dissociated in the second stage, and a specific mass-to-charge ratio can be selected and measured in the third stage from the generated product ion. Such a measurement method is called SRM.

The ion selected by the mass-to-charge ratio and introduced into a detector is detected as a signal corresponding to an amount thereof. The signal of the ion amount detected by the mass spectrometry part 205 is sent to an analysis part 206, and various data processing such as smoothing processing, peak detection processing, and area and height calculation processing is performed as a chromatogram of the SIM and SRM. A peak area and a peak height calculated here become measurement values.

When an amount and a concentration of a specific component is desired to be analyzed in an unknown sample, first, a standard sample of a plurality of concentration series produced in a target concentration range is analyzed by an analyzer, and a graph showing a relationship between the measurement value and the concentration is derived from the association between the calculated measurement value and the known concentration. This graph is called a calibration curve. Next, the unknown sample is measured, and the measurement value of the target analyte is calculated, and thereafter, the measurement value is applied to the calibration curve to calculate a concentration value. When the calibration curve is generated as described, a sample with an unknown concentration can be measured, and the concentration can be estimated from the calibration curve with respect to the measurement value.

When the quantitative analysis is performed by the liquid chromatograph-mass spectrometer, an internal standard method is generally used. In the case of the internal standard method, for example, an internal standard material having a retention time similar to that of the target analyte and having a mass-to-charge ratio different from that of the target analyte is added to a sample collected from a living body. FIG. 3 is a conceptual diagram illustrating an example of a sample produced by the internal standard method and an example of signal intensity when the sample is measured by a mass spectrometer. Standard samples 311 to 313 and an unknown sample 314 obtained by adding a fixed amount of internal standard material 302 to target analytes 301 having several concentrations that match a series of measurement concentrations are measured. In data processing, first, with respect to the standard samples 311 to 313, peak detection is performed for each of a peak 321 of the target analyte and a peak 322 of the internal standard material, and the calibration curve is generated by associating a ratio of measurement values, that is, a value of (a measurement value of the target analyte)/(a measurement value of the internal standard material) with the known concentration.

FIG. 4 is a diagram illustrating an example of the calibration curve generated by the internal standard method. When the measurement values of the target analytes of the standard samples 311 to 313 are defined as $a_1$ to $a_3$ and the measurement values of the internal standard materials are defined as $i_1$ to $i_3$, a calibration curve 401 can be drawn with respect to the known concentrations $c_1$ to $c_3$ of the target analytes contained in the respective standard samples. Thereafter, the unknown sample 314 is measured, and a concentration $c_u$ of the target analyte contained in the unknown sample can be calculated from a measurement value $a_u$ of the target analyte and a measurement value $i_u$ of the internal standard material. That is, the concentration $c_u$ can be obtained by applying a ratio value $(a_u/i_u)$ to the calibration curve 401.

As described above, an advantage of the internal standard method that performs calculation using the ratio of the measurement values of the target analyte and the internal standard material is that, for example, error factors such as an error in a sample injection amount and an error caused by volatilization of the solvent are offset by the ratio calculation, and the result is not affected. In order to achieve the advantage, it is necessary to perform selection of the internal standard material so that the chemical behaviors of the target analyte and the internal standard material become as equal as possible.

In the liquid chromatograph-mass spectrometer, it is generally performed that an element labeled with a stable isotope with respect to the target analyte is used as the internal standard material, and separated and detected by the mass spectrometry part from a difference in the mass-to-charge ratio. Specifically, a stable isotope labeled compound obtained by substituting some atoms forming the target analyte with nitrogen stable isotope 15N, carbon stable isotope 13C, oxygen stable isotope 18O, and hydrogen stable isotope 2H is used as the internal standard material. For example, one labeled with 13C (hereinafter referred to as Testosterone 13C) can be used in Testosterone. The concentration can be any amount according to the sensitivity and accuracy of the mass spectrometer, and for example, 500 fmol can be used.

FIG. 1 is a conceptual diagram illustrating an example in which a retention time of a component peak start point and a component peak end point of an internal standard material chromatogram is applied to a peak start point and a peak end point of a target analyte chromatogram.

When the SRM simultaneously measures the target analyte and the internal standard material, as illustrated in FIG. 1, two chromatograms, that is, a chromatogram of the target analyte 101 and a chromatogram of the internal standard material 102, are obtained.

In this case, in a related art, a measurement value corresponding to a peak 113 of the chromatogram of the internal standard material and a retention time of a peak top are obtained; a peak (group) in a predetermined region is detected from the chromatogram of the target analyte 101; and (a set including) the measurement value(s) thereof and the retention time of the peak top are obtained. A peak 123 closest to the retention time of the peak of the internal standard material is selected as the target analyte from the obtained peak (group). When the peak is detected by providing criteria of the signal intensity, the peak 123 cannot be detected depending on the criteria. Thus, when the criteria are lowered, even enough there is not enough signal intensity, complicated processing for the peak detection such as a method of detecting the gradient of variations of the signal intensity and fitting to a Gaussian function is repeated, which makes it difficult to obtain a reliable result.

However, as described above, since the internal standard material is selected so that the chemical behavior thereof is equal to that of the target analyte as much as possible, the retention times of the two chromatograms are almost equal. That is, the retention time of a peak start point and a peak end point in the chromatogram of the target analyte 101 is considered to be similar to the retention time of the peak start point and the peak endpoint of the internal standard material. The example focuses on this point. Thus, the retention time of a peak start point 111 and a peak end point 112 of the internal standard material is set as the retention time of a peak start point 121 and a peak end point 122 of the target analyte, and the area and the height of the peak is calculated, which is a method of the example.

It is desirable that the retention time of the internal standard material is the same as that of the target analyte, and when the influence on the calculation of the peak area and the peak height of the target analyte is negligible, there is no problem even though the retention times of the target analyte and the internal standard material have deviated.

FIG. 8 is a functional block diagram illustrating an example of a configuration related to the peak detection provided in the analysis part 206 of the liquid chromatograph-mass spectrometer of the example. The peak determination of the example will be described with reference to FIG. 8.

In the chromatogram of the internal standard material obtained by the SIM or the SRM, the peak is determined by a peak detection part 801, and a peak start point 806, a peak endpoint 809, and internal standard peak portion data 808 are outputted. A peak range detection part 802 extracts a peak start time 813 and a peak end time 814 from the peak start point and the peak endpoint. A peak range application part 803 uses the peak start time and the peak end time, thereby outputting component peak portion data 810 from the target analyte chromatogram. A peak calculation part 804 obtains an internal standard measurement value (area and height) and a component measurement value (area and height) from the internal standard peak portion data 808 and the component peak portion data 810, respectively. In Example 1, the peak range detection part 802 only extracts the peak start time 813 from the peak start point 806, and only extracts the peak end time 814 from the peak end point 809. Further functions of the peak range detection part 802 will be described in Example 2.

FIG. 9 is a flowchart illustrating a flow of processing related to peak detection. After data are collected (S11), the peak detection part 801 detects the peak of the chromatogram of the internal standard material (S12). The peak range detection is performed by the peak range detection part 802 (S13). Based upon the peak start time 813 and the peak end time 814 obtained by the peak range detection part 802, the peak range application part 803 performs peak range application with respect to the chromatogram of the target analyte (S14), and peak calculation is performed in the peak calculation part 804 (S15). The values of the peak area and the peak height of the target analyte obtained here can be used to generate the calibration curve and calculate the concentration by obtaining the ratio of the peak area to the peak height of the internal standard material.

By performing the above-described steps, it is possible to calculate a reliable measurement value without being affected by the presence or absence of the signal derived from the target analyte and the signal intensity. The internal standard material is contained in the whole sample with a fixed amount, and the peak surely appears in the chromatogram of the SIM or the SRM. As the internal standard material, for example, the stable isotope labeled compound having the retention time similar to that of the target analyte is selected. The area and height are calculated for the chromatogram of the target analyte by using the retention time of the peak start point and the peak end point of the internal standard material, whereby the measurement value can be calculated even when it is difficult to detect the peak of the target analyte.

On the contrary, even when a problem of variations in the retention time occurs as described in the technical problem, it is considered that both the target analyte and the internal standard material show the same behavior and vary. Therefore, even when the peak of the target analyte as described above is in a state of not being detected and the variations in the retention time can occur, the measurement value can be correctly calculated according to the method of the embodiment.

In a related art, there is a case in which it is difficult to detect the peak due to a minute amount of the target analyte, and there is a case in which the peak cannot be detected due to an influence of a relatively large amount of contaminants which causes the peak to be determined as noise. However, by determining the peak of the target analyte from the retention time of the peak start point and the peak end point of the internal standard material, the measurement value of the target component can be obtained even in the above-described circumstances, and the robustness is excellent.

In the embodiment, Testosterone 13C is used as the internal standard material for Testosterone which is the target analyte. That is, a fixed amount of Testosterone 13C is added to the sample as the internal standard material, and this sample is measured by the liquid chromatograph-mass spectrometer, thereby obtaining the chromatogram of the target analyte and the chromatogram of the internal standard material.

An example of analysis conditions for Testosterone and Testosterone 13C will be described. In the liquid chromatograph, the solvent is a water/acetonitrile solution with a flow rate of 0.2 mL/min, and the column uses a C18 column (a particle diameter of 5 μm, a tube diameter of 2.0 mm×50 mm). The retention time under the conditions can be shown by, for example, 64 seconds. The separated sample is ionized by, for example, an ESI ion source, and measured by the SRM with the triple-quadrupole mass spectrometer.

FIG. 5 is a diagram illustrating an example of measurement result data of the SRM in the unknown sample of Testosterone and Testosterone 13C. This diagram illustrates an example in which a retention time of a peak start point and a peak endpoint of Testosterone 13C is applied to a peak start point and an end point of Testosterone. A chromatogram 501 of Testosterone is a result of performing component separation and SRM measurement under the above-described analysis conditions, and mass-to-charge ratios to be set in Q1 and Q3 at this time are 289 and 97, respectively. In the same manner, a chromatogram 502 of Testosterone 13C is a result of measuring Testosterone 13C with SRM, and the mass-to-charge ratios to be set in Q1 and Q3 at this time are 292 and 100, respectively.

In the analysis result example, since the concentration of Testosterone which is the target analyte is low and thus a peak 505 of Testosterone in the chromatogram 501 is not clear, accurate peak detection is difficult to be performed. On the other hand, a peak 506 of Testosterone 13C added with a sufficient amount as the internal standard material has a good signal-to-noise ratio (S/N), and thus an easily identifiable peak is obtained.

In the embodiment, first, the peak detection is performed on the peak 506 of Testosterone 13C. Accordingly, a peak start point 511 and a peak end point 512 are detected. A baseline 504 of Testosterone 13C connecting these two points is drawn, and an area and a height of the peak 506 of Testosterone 13C are calculated. Next, a retention time of the peak start point 511 and the peak end point 512 detected with respect to the peak 506 of Testosterone 13C is applied to the chromatogram 501 of Testosterone, thereby obtaining a peak start point and a peak end point of the peak 505 of testosterone. The signal intensity at each point is a value corresponding to the retention time of the peak start point 511 and the peak end point 512 in the arrangement of the signal intensity of the chromatogram 501 of Testosterone. A testosterone baseline 503 connecting these two points is drawn, and an area and a height of the peak 505 of Testosterone are calculated. Finally, an area ratio and a height ratio of Testosterone to Testosterone 13C are calculated, and the concentration is calculated from the calibration curve.

Since the SRM generally detects the amount of ions corresponding to a plurality of mass-to-charge ratios in a time-division system, the chromatogram 501 of Testosterone and the chromatogram 502 of Testosterone 13C may not coincide with the retention time of each data point. In such a case, each data point of the chromatogram 501 of Testosterone that exists closest to each retention time of the peak start point 511 and the peak end point 512 detected with respect to the peak 506 of Testosterone 13C may be defined as the peak start point and the peak end point of the peak 505 of Testosterone.

By using the above-described method, it is possible to calculate the area and the height by drawing the baseline without performing the peak detection of the peak 505 of Testosterone when identification is difficult. That is, when it is difficult to identify the peak due to a large amount of noise, and in addition thereto, even when the problem of variations in the retention time occurs, the area and the height of the target analyte can be more reliably calculated.

As another effect, since the peak detection of the target analyte is not required, a load of data analysis processing is reduced. Particularly, since it is common that the internal standard material is measured in a concentration range that can be detected with a sufficient S/N by the detector, it is possible to accurately calculate the peak start point and the peak end point with a relatively simple algorithm. Since the retention time of the peak start point and the peak end point can be applied to the chromatogram of the target analyte, the peak of the target analyte whose concentration range is unknown and whose retention time varies can be reliably detected, thereby drastically reducing the load of the data analysis processing.

FIG. 6 is a diagram illustrating an example of a graphical user interface in the analysis part 206 for instructing a peak detection method in the present example. The target analyte and the internal standard material which become the targets of the peak detection are used as detection target components.

In FIG. 6, an "ID" designates a number of the detection target component in order from 1, and the number of the ID corresponds to a measurement channel of the SRM of the mass spectrometer. The number thereof may be an automatic input according to a setting state of the detection target component. A "Name" is the name of the detection target component. A user can freely input the name of the item, but cannot set two or more identical names. An "Expected RT" designates a retention time of a peak top of the detection target component. An "RT Range" designates a range to be determined as the peak of the detection target component. In the range of the retention time designated in this column, a peak whose peak top is closest to the Expected RT is determined as the peak of the detection target component. In this example, the peak of Testosterone 13C with ID=2 is determined from (Expected RT−RT Range) to (Expected RT+RT Range), that is, in the retention time range of 64±10 seconds.

An "IS ID" designates the ID of the internal standard material. In the case of the internal standard material itself, 0 is set as a special value in this column. In the case of the target analyte, the ID of the internal standard material that should take the area and height ratios to its component is designated. In the example illustrated in FIG. 6, since Testosterone with ID=1 is required to set Testosterone 13C with ID=2 as an internal standard, the IS ID is set to 2. Since Testosterone 13C is the internal standard material, the special value is set to 0.

A "Peak Detect Type" selects the peak detection method. This column is an input part for optionally selecting a target method from a plurality of peak detection methods. Examples of options are selected from, a gradient detection method (option name: Delta), a peak detection method by fitting (option name: Fitting), and a method of using the peak start time and the peak end time of the internal standard material (With IS). When the method of using the peak start time and the peak end time of the internal standard material (With IS) is selected, the Expected RT and the RT Range are not required to be input, so that these items of the component may be left blank. When the Peak Detect Type is with IS even though the IS ID is set to 0, it is desirable to perform a consistency check such as displaying an error.

As described above, it is possible to set the peak detection method for the target analyte and the internal standard material when performing the peak detection processing from the chromatogram obtained by the SRM of the liquid chromatograph-mass spectrometer.

Example 2

In the case of the SRM using the mass spectrometer, it is common to set a plurality of channels. Therefore, in the measurement of Testosterone of Example 1, Testosterone 13C is simultaneously measured as the internal standard material. The present example further shows an example in which in addition to Testosterone 13C shown in Example 1, Testosterone d3 obtained by substituting some hydrogen atoms contained in Testosterone with deuterium is added to the sample as the internal standard material, and Testosterone 13C and Testosterone d3 are measured simultaneously. That is, in this example, a plurality of different internal standard materials are added to the sample, and a plurality of chromatograms are obtained as the chromatograms of the internal standard materials.

FIG. 7 is a diagram illustrating an example in which Testosterone, Testosterone d3, and Testosterone 13C are measured simultaneously. Here, an example in which a retention time of a peak start point and a peak end point of Testosterone d3 is applied to the peak start points and the peak endpoints of Testosterone and Testosterone 13C is shown. A chromatogram 701 of Testosterone, a chromatogram 702 of Testosterone d3, and a chromatogram 703 of Testosterone 13C are respectively measured simultaneously and individually by the SRM using the mass spectrometer.

With respect to the chromatogram 701 of Testosterone and the chromatogram 703 of Testosterone 13C, the mass-to-charge ratio to be set under the conditions of the SRM is the same as that of Example 1. The mass-to-charge ratios to be set in the chromatogram 702 of Testosterone d3 are 292 and 97 for Q1 and Q3. In this analysis conditions, Testosterone, Testosterone d3, and Testosterone 13C are measured simultaneously, and a peak 711 of Testosterone, a peak 712 of Testosterone d3, and a peak 713 of Testosterone 13C are detected.

With respect to Testosterone d3 and Testosterone 13C which are the internal standard materials, peaks thereof are detected relatively clearly, and the peak 712 of Testosterone d3 has a better signal-to-noise ratio (S/N) than that of the peak 713 of Testosterone 13C. In such a case, for example, a peak start point 721 and a peak end point 722 are detected by using the peak 712 of Testosterone d3 which is the internal standard material having the best S/N, and quantitative values of Testosterone and Testosterone 13C can be calculated with the retention time thereof.

Although two types of internal standard materials are used in the present example, three or more types of internal standard materials may be used. When two or more types of internal standard materials are used, a plurality of chromatograms are obtained as the chromatogram of the internal standard material. Each peak is detected from the plurality of chromatograms, and when the peak start time and the peak end time of each peak are obtained, a plurality of peak start times and a plurality of peak end times are obtained. A set including the peak start time and the peak end time is selected or calculated from the plurality of peak start times and the plurality of peak end times, and the set including the peak start time and peak end time is applied to a peak start time and a peak end time of the chromatogram of the target analyte. As a method of obtaining the set including the peak start time and the peak end time to be applied to the chromatogram of the target analyte, for example, the following methods are included.

(1) For example, a method of selecting one having the best S/N.

In the chromatogram of the internal standard material, a section in the vicinity of the peak of the internal standard material is defined as a noise determination region, and a half value of a difference between the maximum value and the minimum value of the signal intensity in the section is defined as N, and the peak height of the internal standard material is defined as S. From the chromatograms of a plurality of internal standard materials, each S/N thereof is obtained, and the set including the peak start time and the peak end time of the peak of the internal standard material in the largest value of S/N is applied as the peak start time and the peak end time in the chromatogram of the target analyte. Accordingly, more stable peak detection can be performed, and errors and variations can be suppressed in the calculation of the quantitative value.

(2) For example, a method in which S/N having a value equal to or greater than criteria is selected, and with respect to the peak start time and the peak end time, an average value of the peak start time and the peak end time of each selected peak is used.

The chromatogram of the internal standard material having S/N equal to or greater than the criteria is selected, and the average value of the peak start times and the average value of the peak end times in the chromatograms thereof are calculated. The calculated average values thereof are defined as the set including the peak start time and the peak end time to be applied to the chromatogram of the target analyte. Accordingly, the influence of the contaminant and noise can be averaged, thereby contributing to stable peak detection.

(3) For example, a method in which the peaks of all the internal standard materials are detected, and a peak start point having the earliest retention time and a peak end point having the latest retention time are selected from the detected peaks.

Among a plurality of peak start times and a plurality of peak end times obtained from the chromatograms of a plurality of internal standard materials, the earliest peak start time and the latest peak end time are selected as the set including the peak start time and the peak end time to be applied to the chromatogram of the target analyte. By selecting the earliest peak start time and the latest peak end time, a wider range is considered as the peak, and thus stable peak determination can be performed with respect to variations in the peak start point and the peak end point of the target analyte.

(4) For example, a method in which in the data obtained by normalizing the intensity of the chromatogram of the target analyte and the chromatogram of a certain internal standard material, when a difference in the respective signal intensities corresponding to the same retention time is obtained and the variance is defined as a noise value, the internal standard material having the highest ratio of the peak height to the noise value of the internal standard material is selected, and then the peak start time and the peak end time are selected.

The maximum value and the minimum value of each signal intensity in the chromatogram of the target analyte are normalized by 1 and 0, and each signal intensity in the chromatogram of the internal standard material is also normalized by 1 and 0 in the same manner. The difference in the respective signal intensities corresponding to the same retention time is obtained, and the variance is defined as the noise value. The peak start time and the peak end time of the internal standard material having the largest ratio of the peak height to the noise value of the internal standard material are selected as the set including the peak start time and the peak end time to be applied to the chromatogram of the target analyte. By this method, S/N can be obtained even when a noise waveform cannot be stably obtained.

(5) For example, a method in which a square value of the signal intensity at each point of a plurality of chromatograms is obtained, a peak of a chromatogram having the calculated value as a data point is detected, and the peak start time and the peak end time are obtained.

Peak determination is performed on the chromatogram obtained by squaring the signal intensity at each retention time of the chromatogram of the internal standard material, whereby it is possible to perform the peak determination suppressing noise. This method of selecting the peak start time and the peak end time can be used together with the methods described above.

When two or more types of internal standard materials are used, the peak detection part 801 in the block diagram of FIG. 8 is applied a plurality of times. The peak range detection part 802 obtains the peak start time 813 and the peak end time 814 with reference to a plurality of peak start points 806, a plurality of peak end points 809, and each of the internal standard material chromatograms and target analyte chromatograms.

By the methods described above, the peak start point and the peak end point of the target analyte can be correctly detected from the peak start point and the peak end point of the internal standard material.

The present invention is not limited to the above-described embodiments but includes various modifications. For example, the embodiments are described in detail in order to describe the present invention in an easy-to-understand manner, and are not necessarily limited to one including all the configurations described above. Apart of a configuration of one embodiment can be replaced with a configuration of another embodiment, and the configuration of another embodiment is added to the configuration of one embodiment. The addition, deletion, and replacement of another configuration can be made for a part of the configuration of each embodiment.

REFERENCE SIGNS LIST

101: chromatogram of target analyte
102: chromatogram of internal standard material
111: peak start point
112: peak end point
121: peak start point
122: peak end point
201: solvent feeding part
202: sample introduction part
203: sample injection part
204: sample separation part
205: mass spectrometry part
206: analysis part
511: peak start point
512: peak end point
721: peak start point
722: peak end point

The invention claimed is:

1. A chromatography-mass spectrometry method, comprising:
 a step of adding, to a sample, an internal standard material having a retention time similar to that of a target analyte and having a mass-to-charge ratio different from that of the target analyte;
 a step of measuring the sample with a chromatograph-mass spectrometer and obtaining a chromatogram of the target analyte and a chromatogram of the internal standard material;
 a step of detecting a peak from the chromatogram of the internal standard material and obtaining a peak start time and a peak end time of the detected peak of the target analyte based on a corresponding peak start time and a corresponding peak end time of the chromatogram of the internal standard material;

a step of calculating an area and a height of the peak of the chromatogram of the internal standard material using the obtained peak start time and peak end time from the chromatogram of the internal standard material; and a step of calculating a measurement value of the chromatogram of the target analyte by using the calculated area and height of the peak of the chromatogram of the internal standard material in the absence of a detected peak of the chromatogram of the target analyte.

2. The chromatography-mass spectrometry method according to claim 1, wherein a plurality of different internal standard materials are added to the sample as the internal standard material, a plurality of chromatograms are obtained as the chromatogram of the internal standard material, each peak is detected from a corresponding one of the plurality of chromatograms, and a peak start time and a peak end time of each said detected peak are obtained, one set comprising said detected peak start times and a corresponding one of said detected peak end times of the internal standard material is selected from the obtained plurality of peak start times and the obtained plurality of peak end times of the internal standard material, and the selected set of the internal standard material is used to determine the peak start time and the peak end time of the chromatogram of the target analyte.

3. The chromatography-mass spectrometry method according to claim 2, wherein said selected set is determined from a chromatogram having a largest signal-to-noise ratio among the plurality of chromatograms.

4. The chromatography-mass spectrometry method according to claim 2, wherein said selected set is determined from calculating an average value of a plurality of peak start times and an average value of a plurality of peak end times of a chromatogram whose signal-to-noise ratio is equal to or greater than criteria among the plurality of chromatograms.

5. The chromatography-mass spectrometry method according to claim 2, wherein said selected set is determined from an earliest peak start time and a latest peak end time among a plurality of peak start times and a plurality of peak end times obtained from the plurality of chromatograms.

6. The chromatography-mass spectrometry method according to claim 2, wherein said selected set is a peak start time and a peak end time of an internal standard material having a largest ratio of a peak height to noise value determined from data obtained by normalizing a signal intensity of the chromatogram of the target analyte and the chromatogram of one internal standard material, when a difference between respective signal intensities corresponding to a same retention time is obtained and a variance is defined as a noise value.

7. The chromatography-mass spectrometry method according to claim 1, wherein a square value of signal intensity at each point of the chromatogram of the internal standard material is obtained, and a peak start time and a peak end time are obtained from a chromatogram using the square value of signal intensity as a data point.

8. The chromatography-mass spectrometry method according to claim 1, wherein the internal standard material is a stable isotope labeled compound whose retention time is similar to that of the target analyte.

9. A chromatograph-mass spectrometer that simultaneously measures a target analyte and an internal standard material, and obtains a chromatogram of the target analyte and a chromatogram of the internal standard material, the chromatograph-mass spectrometer comprising:

a data processor configured to obtain a peak start point and a peak end point from the chromatogram of the internal standard material;

extract a peak start time and a peak end time of the target analyte from the obtained peak start point and the obtained peak end point of the internal standard material based on a corresponding peak start time and a corresponding peak end time of the chromatogram of the internal standard material;

calculate an area and a height of the peak of the chromatogram of the internal standard material using the obtained peak start time and peak end time from the chromatogram of the internal standard material; and calculate a measurement value of the chromatogram of the target analyte by using the calculated area and height of the peak of the chromatogram of the internal standard material in the absence of a detected peak of the chromatogram of the target analyte.

10. The chromatograph-mass spectrometer according to claim 9, wherein the data processor is further configured to obtain a plurality of pairs of peak start points and peak end points each said pair of peak start points and peak end points being associated with one of a plurality of chromatograms, each said chromatogram having a different internal standard material;

select one set comprising one peak start time and a corresponding peak end time from the obtained plurality of peak start points and the plurality of peak end points; and determine the corresponding peak start time and the corresponding peak end time of the chromatogram of the target analyte using the selected set including the selected peak start time and the selected peak end time.

11. The chromatograph-mass spectrometer according to claim 9, wherein the internal standard material is a stable isotope labeled compound whose retention time is similar to that of the target analyte.

12. The chromatograph-mass spectrometer according to claim 9, wherein the chromatograph-mass spectrometer is a liquid chromatograph-mass spectrometer.

* * * * *